Jan. 15, 1929.
W. B. CLARKE
1,699,047
TRUCK FOR TRAVELING CRANES
Filed Jan. 27, 1928
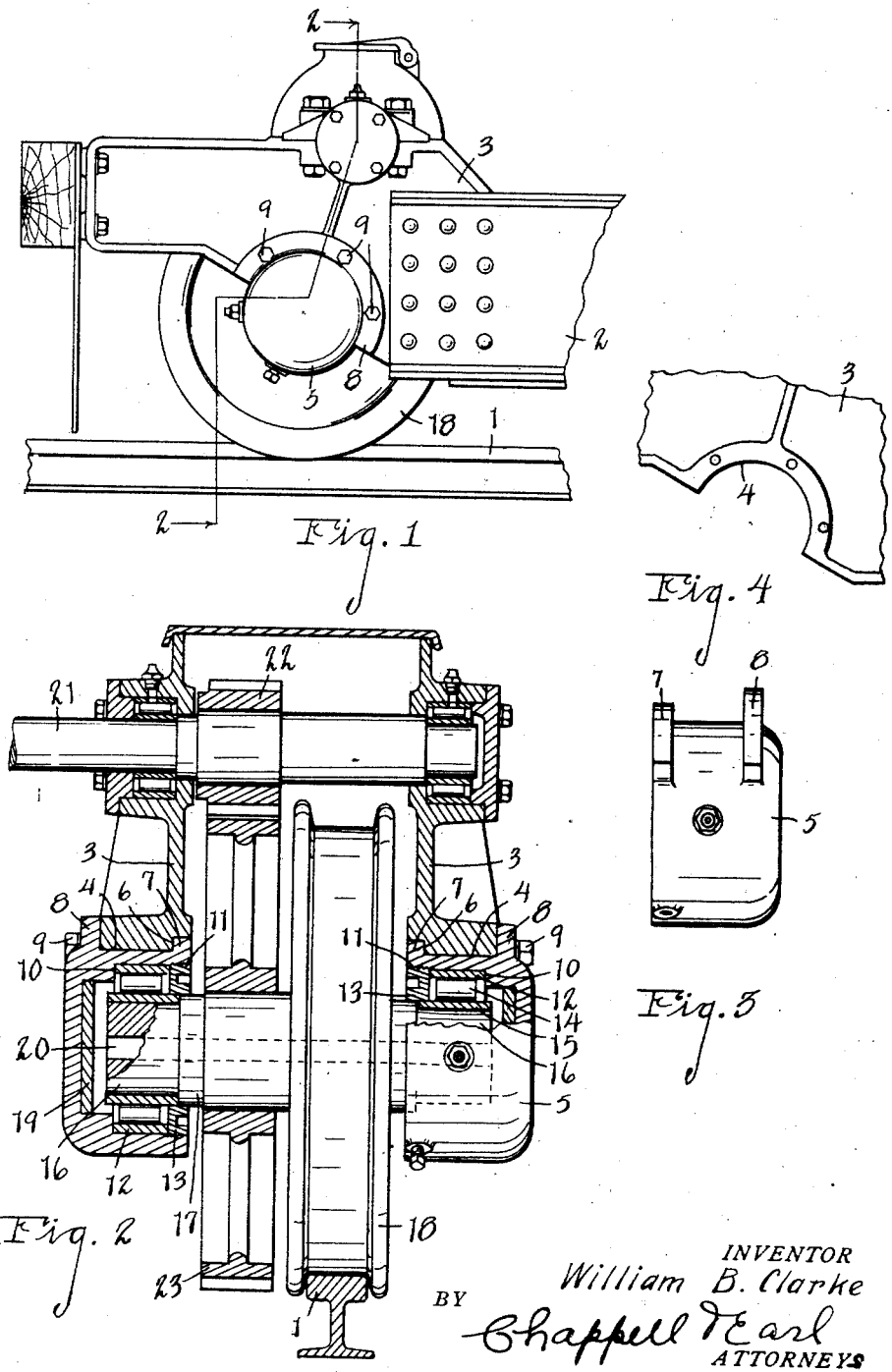
INVENTOR
William B. Clarke
BY
Chappell & Earl
ATTORNEYS Patented Jan. 15, 1929.

1,699,047

UNITED STATES PATENT OFFICE.

WILLIAM B. CLARKE, OF EAST ORANGE, NEW JERSEY, ASSIGNOR TO SHAW CRANE-PUTNAM MACHINE CO. INC., OF MUSKEGON, MICHIGAN, A CORPORATION OF DELAWARE.

TRUCK FOR TRAVELING CRANES.

Application filed January 27, 1928. Serial No. 249,859.

The main objects of this invention are:

First, to provide an improved truck bearing structure for bridge trucks or the trucks of traveling cranes in which the axle is supported to permit limited axial floating movement, and at the same time the lubricant is effectively retained within the bearing.

Second, to provide an improved bearing having these advantages in which the bearing boxes with bearings therein are readily assembled on the truck body as a unit.

Objects relating to details and economies of my invention will appear from the detailed description to follow. The invention is defined and pointed out in the claims.

A structure which is a preferred embodiment of my invention is illustrated in the accompanying drawing, forming a part of this application, in which:

Fig. 1 is a fragmentary side elevation of a bridge end truck embodying the features of my invention.

Fig. 2 is a fragmentary section on the broken line 2—2 of Fig. 1.

Fig. 3 is a side elevation of one of the bearing members.

Fig. 4 is a fragmentary side elevation of one of the truck body members, illustrating the seat formed therein for the bearing box.

In the drawing similar reference numerals refer to similar parts throughout the drawing.

Referring to the drawing, 1 represents one of the rails of a traveling crane track, 2 one of the end members of the crane and 3 the truck body members. These truck body members are provided with seats 4 for the cup-shaped bearing boxes 5, these bearing boxes having integral side and outer end walls and being open on their inner sides.

The box seats 4 are shouldered at their inner edges at 6, while the boxes are provided with inner flanges 7 fitting in the shoulder 6 and outer flanges 8 lapping on the sides of the body members and secured thereto by bolts 9.

The boxes are internally shouldered at 10 and internally threaded at 11.

The outer bearing members 12 are arranged within the boxes against the shoulders 10, the bearing members being clamped against the shoulders by the retaining rings 13. The shoulders 10 and the retaining rings form end thrust members for the bearing rollers 14.

The inner bearing members 15 are secured on the reduced portions 16 of the axle 17 and are substantially longer than the outer bearing members, the same being axially slidable within the rings 13.

A wheel 18 is secured to the axle so that it moves axially therewith. The end thrust plates 19 are arranged in the ends of the bearing boxes to coact with the ends of the axle.

The axle is provided with a longitudinal lubricant passage 20 so that as the axle moves longitudinally in the boxes, the lubricant, ordinarily in the form of grease, may pass through this passage into the opposite box. This prevents forcing the lubricant out of the box and avoids the necessity of packing the inner bearing member, the axle being merely a sliding fit within the ring 13.

The bearing illustrated is conventionally shown with the exception that the inner bearing member is of such length as to permit its axial movement relative to the bearing rollers.

The driving shaft 21 is provided with a pinion 22 meshing with a gear 23 on the axle. These details, however, form no part of this invention.

By thus mounting the bearing boxes, they may be readily removed as occasion requires for the removal of the thrust bearing plates or the changing of these bearing plates to thicker or thinner plates to limit the amount of axial travel permitted the axle.

I have not attempted to illustrate and describe various modifications and adaptations of my improvements which I contemplate as it is believed the disclosure made will enable those skilled in the art to embody or adapt my improvements as may be desired.

Having thus described my invention, what I claim as new and desire to secure by Letters Patent, is:

1. In a structure of the class described, the combination of a pair of spaced body members provided with downwardly facing segmental bearing box seats shouldered at the inner edges thereof, bearing boxes disposed in said seats and having inner segmental flanges engaging said shoulders and outer segmental flanges overlapping the outer sides of the body members and secured thereto, said bearing boxes being open at their inner ends, thrust plates disposed in the ends of said bearing boxes, roller bearings comprising rollers and outer and inner bearing members, said outer bearing members being mounted within said boxes, a wheel, and an axle to which said wheel is secured floatingly supported in said bearings for axial movement, said axle having a longitudinal passage therethrough permitting the passage of lubricant from one bearing box to the other.

2. In a structure of the class described, the combination of a pair of spaced body members provided with downwardly facing segmental bearing box seats shouldered at the inner edges thereof, bearing boxes disposed in said seats and having inner segmental flanges engaging said shoulders and outer segmental flanges overlapping the outer sides of the body members and secured thereto, said bearing boxes being open at their inner ends, roller bearings comprising rollers and outer and inner bearing members, said outer bearing members being mounted within said boxes, a wheel, and an axle to which said wheel is secured.

3. In a structure of the class described, the combination of a pair of spaced body members provided with downwardly facing segmental bearing box seats shouldered at the inner edges thereof, bearing boxes disposed in said seats and having inner segmental flanges engaging said shoulders and outer segmental flanges overlapping the outer sides of the body members and secured thereto, thrust plates disposed in the ends of said bearing boxes, bearings within said boxes, an axle supported in said bearings for axial floating movement, and a wheel fixed to said axle.

4. In a structure of the class described, the combination of a pair of spaced body members provided with downwardly facing segmental bearing box seats shouldered at the inner edges thereof, bearing boxes disposed in said seats and having inner segmental flanges engaging shoulders and outer segmental flanges overlapping the outer sides of the body members and secured thereto, bearings within said boxes, an axle supported in said bearings, and a wheel fixed to said axle.

5. In a structure of the class described, the combination of a truck body, a wheel, an axle to which the wheel is secured, internally shouldered cup-shaped bearing boxes, roller bearings comprising bearing rollers and inner and outer bearing members, the outer bearing members being arranged in said boxes and the inner bearing members being arranged on said axle and being of such length as to permit axial movement within the bearing rollers, retaining rings for said outer bearing members and bearing rollers, said axle having a longitudinal bore therein permitting lubricant to pass from one bearing box to the other, and thrust bearing plates arranged in the ends of said bearing boxes to coact with the ends of the axle.

6. In a structure of the class described, the combination of a truck body, a wheel, an axle to which the wheel is secured, internally shouldered cup-shaped bearing boxes, roller bearings comprising bearing rollers and inner and outer bearing members, the outer bearing members being arranged in said boxes and the inner bearing members being arranged on said axle and being of such length as to permit axial movement within the bearing rollers, and retaining rings for said outer bearing members and bearing rollers, said axle having a longitudinal bore therein permitting lubricant to pass from one bearing box to the other.

7. In a structure of the class described, the combination of bearing boxes disposed in opposed spaced relation and having integral end and side walls and being open at their inner ends and internally shouldered, thrust plates disposed in the ends of said bearing boxes, bearings comprising bearing rollers and outer and inner bearing members, said outer bearing members being seated against said shoulders, said shoulders constituting inner end thrust members for said rollers, retaining rings threaded into said bearing boxes to clamp said outer bearing members upon said shoulders and constituting outer end thrust members for said rollers, a wheel, and an axle to which said wheel is secured, said inner bearing members being secured to said axle and having axial movement relative to said bearing rollers and said retaining ring, said axle having a longitudinal lubricant passage therethrough permitting the passage of lubricant from one bearing box to the other.

8. In a structure of the class described, the combination of bearing boxes disposed in opposed spaced relation and being open at their inner ends and internally shouldered, thrust plates disposed in the ends of said bearing boxes, bearings comprising bearing rollers and outer and inner bearing members, said outer bearing members being seated against said shoulders, said shoulders constituting inner end thrust members for said bearing rollers, retaining rings threaded into said bearing boxes to clamp said outer bearing members upon said shoulders and constituting outer end thrust members for said rollers, a wheel, and an axle to which said wheel is secured, said inner bearing members being secured to said axle and having axial movement relative to said bearing rollers and said retaining ring.

9. In a structure of the class described, the combination of bearing boxes disposed oppositely in spaced relation, said bearing boxes being open at their inner ends, thrust plates disposed in the outer ends of said bearing boxes, bearings within said boxes, a wheel, and an axle to which said wheel is secured floatingly supported in said bearings for axial movement, said axle having a longitudinal passage therethrough permitting the passage of lubricant from one bearing box to the other.

10. In a structure of the class described, the combination of bearing boxes disposed oppositely in spaced relation, said bearing boxes being open at their inner ends, bearings within said boxes, a wheel, and an axle to which said wheel is secured floatingly supported in said bearings for axial movement, said axle having a longitudinal passage therethrough permitting the passage of lubricant from one bearing box to the other.

In witness whereof I have hereunto set my hand.

WILLIAM B. CLARKE.